United States Patent

DeCain et al.

[11] Patent Number: 5,986,759
[45] Date of Patent: Nov. 16, 1999

[54] OPTICAL INTERFEROMETER MEASUREMENT APPARATUS AND METHOD

[75] Inventors: Donald Michael DeCain, New York; Philip C. D. Hobbs, Briarcliff Manor, both of N.Y.; Keith Randal Pope, Danbury, Conn.

[73] Assignee: International Business Machines Corporation, Armonk, N.Y.

[21] Appl. No.: 09/127,430

[22] Filed: Jul. 13, 1998

[51] Int. Cl.$^6$ ............................................. G01B 9/02
[52] U.S. Cl. ........................ 356/345; 356/346; 356/352; 372/33
[58] Field of Search ............................... 356/345, 346, 356/352; 372/33

[56] References Cited

U.S. PATENT DOCUMENTS 5,313,270  5/1994  Fishman et al. .................... 356/352

Primary Examiner—Robert H. Kim
Assistant Examiner—Andrew H. Lee
Attorney, Agent, or Firm—McGinn & Gibb, P.C.; Stephen C. Kaufman, Esq.

[57] ABSTRACT

Method and apparatus for realizing unusually sensitive and stable interferometric measurement capabilities. The apparatus comprises an optical interferometer with at least two optical outputs, the ratio of whose intensities can vary with a tuning parameter; and at least one detector, each of which is optically connected to the interferometer, and producing in aggregate at least two linearly-independent signals that depend on the light intensity and the tuning parameter, which are combined to produce a first measurement whose sensitivity to light intensity changes is substantially smaller than that of either of the two linearly-independent signals, and a second measurement whose sensitivity to the tuning parameter is substantially smaller than that of either of the two linearly-independent signals.

23 Claims, 2 Drawing Sheets

OPTICAL INTERFEROMETER MEASUREMENT APPARATUS AND METHOD

BACKGROUND OF THE INVENTION

This invention relates to apparatus and methodology suitable for optical interferometric measurement.

INTRODUCTION TO THE INVENTION

Our background work to the present invention subsumes optical interferometric measurement analysis and technique. One significant aspect of this background work relates to optical extinction and phase measurement analysis—said significance deriving from the fact that this work is fundamental to many measurement devices, such as absorption spectrometers and sol particle detectors. In particular, the sensitivity of these measurements may be limited by problems including available integration time, spurious optical signals, or laser noise.

Our background work has identified these cited problems, to an end of developing methodology which can effect, with reference to pertinent prior art such as heterodyne interferometry, very considerable simplifications in ultra-high sensitivity phase and amplitude measurements.

For example, we have invented a laser noise canceller (see U.S. Pat. No. 5,134,276 to Hobbs), the laser noise canceller comprising a signal processing circuit which can make shot-noise-limited optical measurements possible at baseband, thereby effecting the asserted very considerable simplifications over earlier art techniques in ultra-high sensitivity phase and amplitude measurements.

SUMMARY OF THE INVENTION

Our present work begins with an evaluation of the laser noise canceller disclosed in U.S. Pat. No. 5,134,276 to Hobbs. First, shot-noise limited absorption spectroscopy, using this invention, has been reported. For example, with a 5 mW, 632.8 nm laser, the shot noise limit in a one-second measurement corresponds to an extinction uncertainty of 1 part in $10^8$. We note, however, that this measurement only corresponds to measuring an intensity change in a transmitted beam, whereas for many purposes, such as composition determination in particle counters, it is useful to measure the phase of the disturbance, as well. In addition, higher sensitivity is always desirable.

One known such sensitivity enhancement method centers on a use of a Fabry-Perot etalon. Here, an absorbing or scattering sample is placed inside a low-loss resonant optical cavity (etalon). When a light source (usually a laser) is tuned to a cavity resonance, the optical energy density inside the cavity is enhanced by a large factor, often $10^2$ to $10^5$, which may be heuristically explained by the light needing many bounces from the cavity end mirrors to be absorbed or to escape.

We note that important problems with the Fabry-Perot technique are the need for a separate servomechanism to tune the laser or the etalon to eliminate drift, and the continued limitations caused by laser noise. The servo system requires a way to measure the laser-to-cavity tuning error with sufficient accuracy that intensity changes due to tuning errors do not limit the accuracy of the measurement, which is usually difficult; the most common solution is to dither the laser or the cavity and use lock-in detection to sense the position of zero tuning error.

Motivation for the present invention is informed by the Fabry-Perot technique, with a view to overcoming most of its limitations and cited problems, thereby advantageously realizing unusually sensitive and stable optical interferometric measurement capabilities.

Accordingly, in a first aspect, the present invention discloses a method comprising:

(1) providing an optical interferometer with at least two optical outputs, the ratio of whose intensities varies with a tuning parameter; (2) inputting light to the optical interferometer; (3) detecting the two optical outputs to yield two linearly-independent signals that depend on the light intensity and the tuning parameter; and (4) combining said two linearly independent signals to produce a first measurement whose sensitivity to light intensity changes is substantially smaller than that of either of the two linearly-independent signals, and a second measurement whose sensitivity to the tuning parameter is substantially smaller than that of either of the two linearly-independent signals.

In a second aspect, the present invention discloses a method comprising: (1) providing an optical interferometer with at least two optical outputs, the ratio of whose intensities varies with a tuning parameter; (2) inputting light to the optical interferometer; and (3) detecting the two optical outputs to yield two linearly-independent signals which are combined to produce orthogonal measurements of light intensity and the tuning parameter.

In a third aspect, the present invention discloses an apparatus comprising: (1) an optical interferometer with at least two optical outputs, the ratio of whose intensities can vary with a tuning parameter; and (2) at least one detector, each of which is optically connected to the interferometer, and producing in aggregate at least two linearly-independent signals that depend on the light intensity and the tuning parameter, which are combined to produce a first measurement whose sensitivity to light intensity changes is substantially smaller than that of either of the two linearly-independent signals, and a second measurement whose sensitivity to the tuning parameter is substantially smaller than that of either of the two linearly-independent signals.

In a fourth aspect, the present invention discloses an apparatus comprising: (1) an optical interferometer with at least two optical outputs, the ratio of whose intensities can vary with a tuning parameter; and (2) at least one detector, each of which is optically connected to the interferometer, and producing in aggregate at least two linearly-independent signals which are combined to produce orthogonal measurements of light intensity and the tuning parameter when light of appropriate wavelength and coherence is input to the optical interferometer.

BRIEF DESCRIPTION OF THE DRAWING

The invention is illustrated in the accompanying drawing in which.

DETAILED DESCRIPTION OF THE INVENTION

Figure 1:
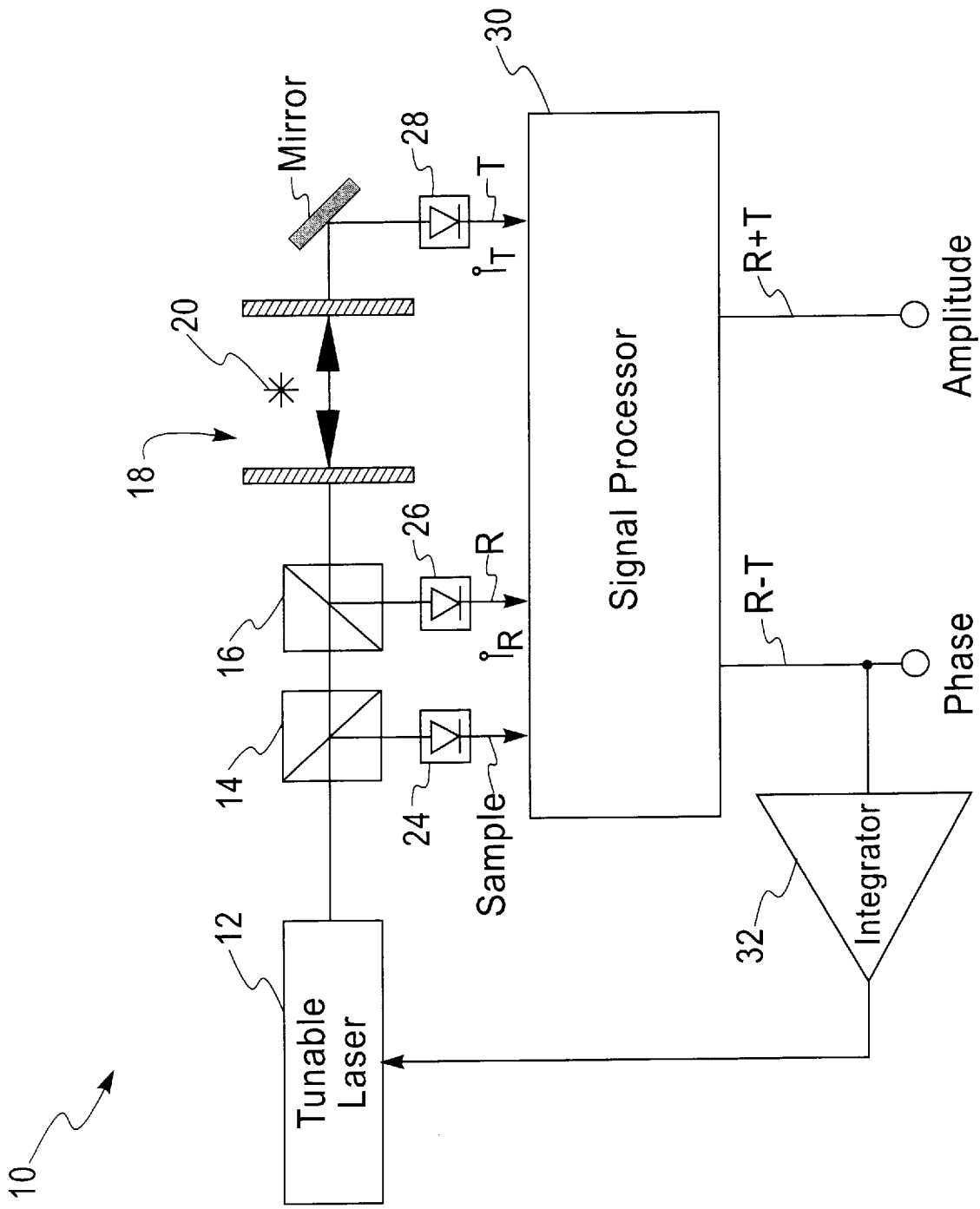
FIG. 1 shows a tunable-laser embodiment of the present invention.
Figure 2:
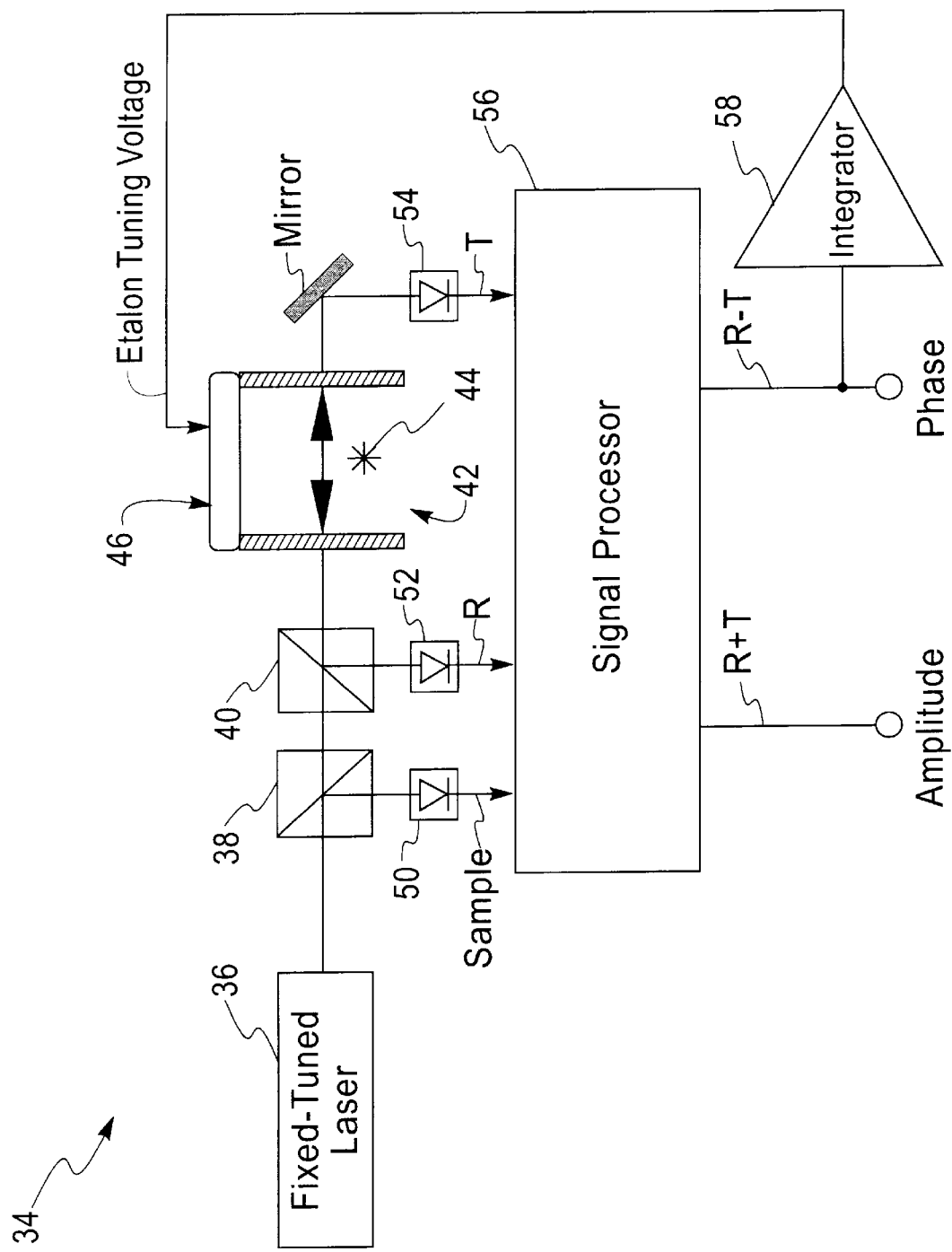
FIG. 2 shows a fixed-tuned-laser embodiment of the present invention.

The detailed description of the invention unfolds by first disclosing preferred or alternative features or limitations of the method, followed secondly by an analogous disclosure of preferred or alternative aspects of the apparatus, and concluding thirdly with an explication of the FIGS. 1 and 2 embodiments of the present invention.

The method is summarized above and includes three steps.

The first step requires providing an optical interferometer with at least two optical outputs, the ratio of whose intensities varies with a tuning parameter. The tuning parameter, alternatively, may be the wavelength of the input light, or the optical path delay in the interferometer, or a combination of the optical path delay in the interferometer and the wavelength of the input light. The optical interferometer, in turn, may be selected from the group consisting of an etalon, a Michelson interferometer, and a Mach-Zehnder interferometer.

The input light in step 2 preferably comes from a laser.

The method preferably further includes an independent or distinct fourth step. The fourth step may comprise:

1) making a measurement of optical extinction via the light intensity measurement;

and/or 2) making a measurement of wavelength, using an imputed change in the tuning parameter as measured by one of the orthogonal outputs;

and/or 3) making a measurement of optical phase inside the interferometer, using an imputed change in the tuning parameter as measured by one of the orthogonal outputs;

and/or 4) making a measurement of relative tuning of the light source and the interferometer;

and/or 5) varying the tuning parameter to stabilize at least one of the orthogonal measurements.

We now turn our attention to preferred aspects of the apparatus of the present invention, summarized above, which is suitable for realizing the method steps.

The apparatus requires at least one detector, each of which is optically connected to an optical interferometer, and producing in aggregate at least two linearly-independent signals which are combined to produce orthogonal measurements of light intensity and a tuning parameter when light of appropriate wavelength and coherence is input to the optical interferometer.

Preferably, at least one detector comprises a photodiode, the photodiode receiving as an input one of the optical outputs of the interferometer, and producing one of the linearly independent signals.

The optical interferometer may comprise a Fabry-Perot interferometer, wherein the optical outputs preferably are derived from light reflected and transmitted by it.

The apparatus preferably further comprises feedback means whose input is a difference between one of the orthogonal outputs and a set point and which adjusts the tuning of the interferometer so as to stabilize this difference. For example, the set point may be chosen to be a null point where the tuning parameter measurement is insensitive to intensity changes.

The apparatus may further comprise an electrically tunable laser for providing the light of appropriate wavelength and coherence for input to the interferometer. For this situation, the apparatus preferably further comprises feedback means whose input is a difference between one of the orthogonal outputs and a set point and which adjusts the tuning of the laser so as to stabilize this difference. The set point may be chosen to be a null point where the tuning parameter measurement is insensitive to intensity changes.

Attention is now directed to FIGS. 1–2 which show, respectively, first and second embodiments of apparatus suitable for realizing the method of the present invention. The choice of a preferred realization depends on the availability of cost-effective tunable lasers operating at the wavelength of interest; if they are available, the system shown in FIG. 1, numerals 10–32, is preferred; if not, the system of FIG. 2, numerals 34–58 is preferred.

FIG. 1 shows the tunable-laser version. A beam from a tunable laser 12 (e.g., a diode laser) passes through beam splitter 14, 16, then into an etalon 18. Inside the cavity is a scatterer 20, which causes an extinction $\epsilon$ and a phase perturbation $\delta\phi$ in one pass of the beam. A transmitted (T) beam and reflected (R) beam, together with a sample of the laser output (S) are detected and fed to a signal processor 30. This signal processor 30 consists of a differential version of the noise canceller already cited (Hobbs, 1990), and puts out two voltages which are related to the ratio of the sum (R+T) and difference (R−T) of the reflected and transmitted beams to the sample beam. This processor 30 can eliminate the effect of laser noise and spurious signals above the shot noise level, allowing the system to operate right at the shot noise limit. The R−T output is integrated (32) and fed to the tunable laser 12 as its tuning current; this stabilizes the operating point of the system half way up the resonance curve of the etalon, where R−T is zero.

In the absence of absorption, the sum of the reflectance R and transmittance T is unity; any phase change inside the cavity will redistribute the total beam power between the transmitted and reflected beams, resulting in a nonzero R−T signal; this will persist for a short time, during which the servo loop adjusts the operating wavelength of the laser to zero it out. An extinction signal unaccompanied by any phase shift will cause optical loss inside the cavity; by conservation of energy, the sum signal T+R must decrease. For small extinctions, where the total reduction in R+T is several percent or less, the operating point is stable; R and T decrease by almost exactly the same amount, so the amplitude perturbation does not cause any apparent phase perturbation. In this way, the amplitude and phase of the scatter signal can be measured separately, to great accuracy.

If there is significant excess loss in the cavity already, the stability of the operating point will be degraded somewhat. It can be restored by taking a slightly different linear combination of R and T (e.g., T−0.9R for one particular value of extinction) as the phase signal. The exact factors required will depend on the excess loss encountered.

A Fabry-Perot interferometer with a finesse of 1000 has high selectivity; the rate of change of its reflected and transmitted beam intensity as a function of frequency, dR/df and dT/df, are of the order of 1000/f0.

Similarly, both depend linearly on the input beam intensity. The logarithmic output of the laser noise canceller described in U.S. Pat. No. 5,134,276 to Hobbs provides the ratio of the beam powers incident on its two photodetectors, and suppresses the laser intensity information by a factor of at least 20 dB and as much as 60 dB, even when the two beams are unequal in power.

Thus the logarithmic output provides an amplitude-insensitive measure of the relative tuning of the laser and the Fabry-Perot. Alternatively, choosing the set point so that R−T=0 will produce a zero baseline measurement in which an intensity shift produces a change of slope but not of offset, much like a balanced mixer used as a phase detector in a phase-locked loop. In both cases, amplitude shifts do not cause the null point to move, so that the tuning set point is not disturbed.

If the two photocurrents are added together instead (with a slight modification to the circuitry, both can be done at once), after being linearly scaled (with an optical neutral density filter before detection or a resistor network after detection, for example) so that dR/df=−dT/df at the chosen set point, then small changes in the tuning parameter will make one signal increase and the other decrease, producing very much smaller relative changes in their sum. Thus, we can make a tuning-insensitive measurement of the light intensity alone. A third detector, sampling the laser beam alone, can be used as in the patent just cited, to provide a comparison current to cancel the laser noise down to the shot noise level, leaving only signals due to transient extinction events in the cavity. This noise cancellation will in principle be as effective as that of the difference or logarithmic output.

The sensitivity of this approach is very high. With a 5 mW laser at 632.8 nm, the shot noise is equivalent to an absorption uncertainty of 1 part in $10^8$ in 1 second, so with an etalon with an energy density enhancement of a factor of $10^3$, a 1-second measurement could in principle measure an extinction of $10^{-11}$. It could also measure phase perturbation as small as $10^{-12}$ radians.

The advantages of this technique are its high sensitivity, and the accuracy and simplicity of its control and measurement systems.

What is claimed is:

1. A method comprising:
   (1) providing a single optical interferometer with at least two optical outputs, the ratio of whose intensities varies with a tuning parameter;
   (2) inputting light to the optical interferometer;
   (3) detecting the two optical outputs from the single optical interferometer to yield two linearly-independent signals;
   and
   (4) combining said two linearly-independent signals to produce orthogonal measurements of light intensity and the tuning parameter.

2. A method according to claim 1, wherein the tuning parameter comprises the wavelength of the input light.

3. A method according to claim 1, wherein the tuning parameter comprises the optical path delay in the interferometer.

4. A method according to claim 1, wherein the tuning parameter comprises a combination of the optical path delay in the interferometer and the wavelength of the input light.

5. A method according to claim 1, wherein said providing comprises providing an optical interferometer selected from the group consisting of an etalon, a Michelson interferometer, and a Mach-Zehnder interferometer.

6. A method according to claim 1, wherein said inputting light comprises inputting light from a laser.

7. A method according to claim 1, further including making a measurement of optical extinction, via the light intensity measurement.

8. A method according to claim 1, further including making a measurement of wavelength, using an imputed change in the tuning parameter as measured by one of the orthogonal outputs.

9. A method according to claim 1, further including making a measurement of optical phase inside the interferometer, using an imputed change in the tuning parameter as measured by one of the orthogonal outputs.

10. A method according to claim 1, further including making a measurement of relative tuning of the light source and the interferometer.

11. A method according to claim 1, further including varying the tuning parameter to stabilize at least one of the orthogonal measurements.

12. A method comprising:
   (1) providing a single optical interferometer with at least two optical outputs, the ratio of whose intensities varies with a tuning parameter;
   (2) inputting light to the optical interferometer;
   (3) detecting the two optical outputs from the single optical interferometer to yield two linearly-independent signals that depend on the light intensity and the tuning parameter;
   (4) combining said two linearly-independent signals to produce a first measurement whose sensitivity to light intensity changes is substantially smaller than that of either of the two linearly-independent signals, and a second measurement whose sensitivity to the tuning parameter is substantially smaller than that of either of the two linearly-independent signals;
   and
   (5) combining said two linearly-independent signals to produce orthogonal measurements of light intensity and the tuning parameter.

13. An apparatus comprising:
   (1) a single optical interferometer with at least two optical outputs, the ratio of whose intensities can vary with a tuning parameter;
   and
   (2) at least one detector, each of which is optically connected to said single optical interferometer, and producing in aggregate at least two linearly-independent signals which are combined to produce orthogonal measurements of light intensity and the tuning parameter when light of appropriate wavelength and coherence is input to the single optical interferometer.

14. An apparatus according to claim 13, wherein at least one detector comprises a photodiode, the photodiode receiving as an input one of the optical outputs of the interferometer, and producing one of the linearly independent signals.

15. An apparatus according to claim 13, wherein the optical interferometer comprises a Fabry-Perot interferometer.

16. An apparatus according to claim 15, wherein the optical outputs are derived from light reflected and transmitted by the Fabry-Perot interferometer.

17. An apparatus according to claim 13, further comprising means for electrically varying the tuning of the interferometer.

18. An apparatus according to claim 16, further comprising feedback means whose input is a difference between one of the orthogonal outputs and a set point and which adjusts the tuning of the interferometer so as to stabilize this difference.

19. An apparatus according to claim 13, in which the set point is chosen to be a null point where the tuning parameter measurement is insensitive to intensity changes.

20. An apparatus according to claim 13, further comprising an electrically tunable laser for providing the light of appropriate wavelength and coherence for input to the interferometer.

21. An apparatus according to claim 20, further comprising feedback means whose input is a difference between one of the orthogonal outputs and a set point and which adjusts the tuning of the laser so as to stabilize this difference.

22. An apparatus according to claim 21, in which the set point is chosen to be a null point where the tuning parameter measurement is insensitive to intensity changes.

23. An apparatus comprising:
(1) a single optical interferometer with at least two optical outputs, the ratio of whose intensities can vary with a tuning parameter; and
(2) at least one detector, each of which is optically connected to said single optical interferometer, and producing in aggregate at least two linearly-independent signals that depend on the light intensity and the tuning parameter, which are combined to produce a first measurement whose sensitivity to light intensity changes is substantially smaller than that of either of the two linearly-independent signals, and a second measurement whose sensitivity to the tuning parameter is substantially smaller than that of either of the two linearly-independent signals.

* * * * *